Patented Dec. 22, 1931

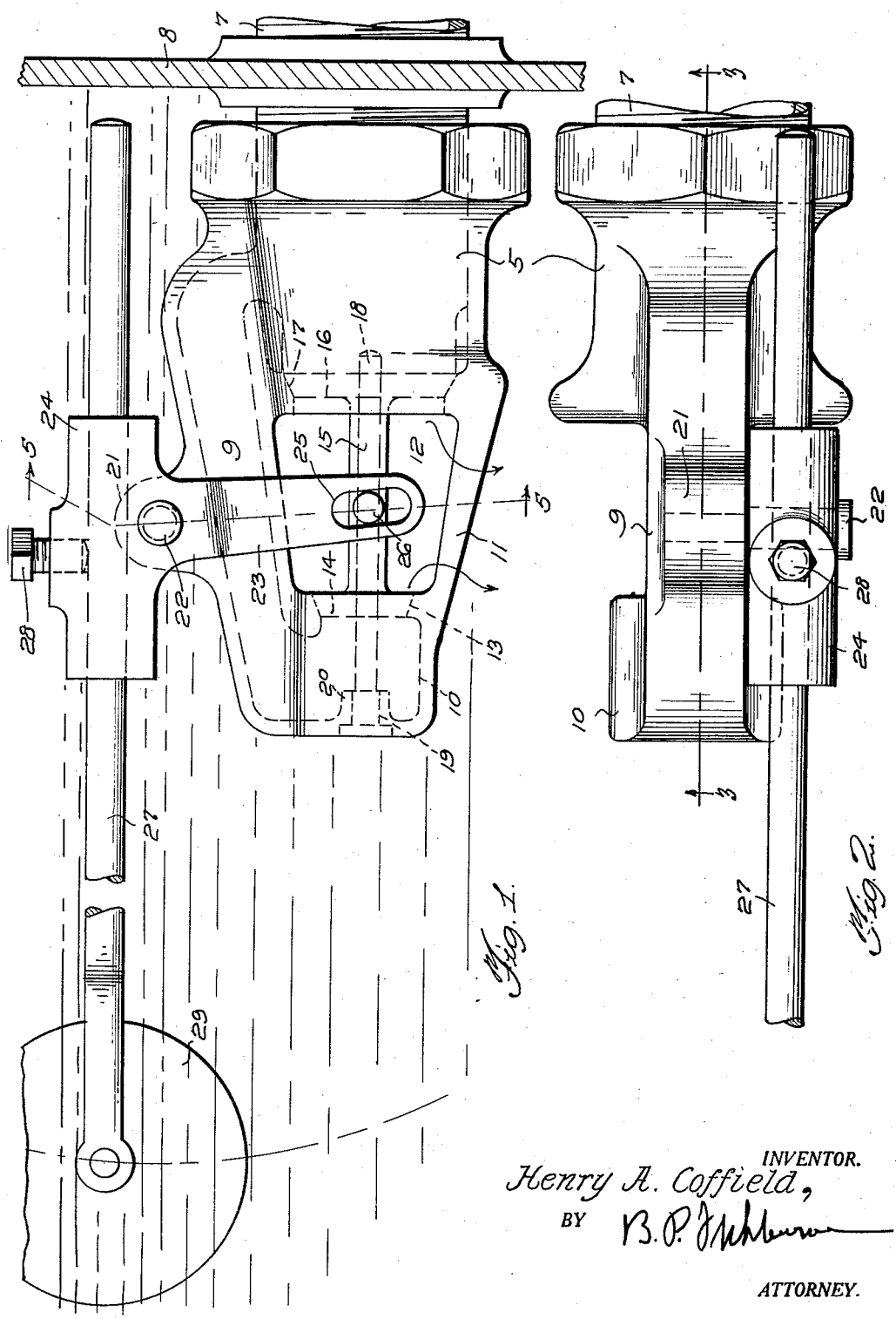

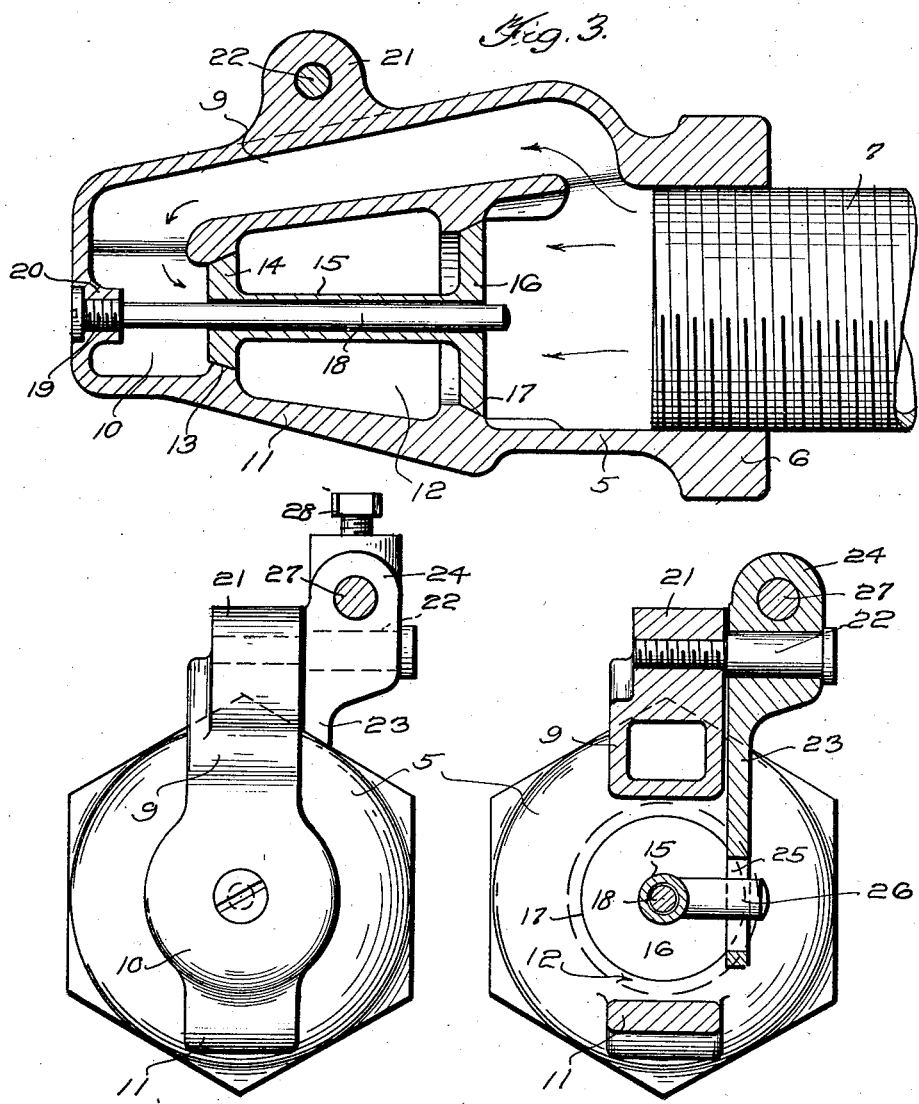

1,837,653

UNITED STATES PATENT OFFICE

HENRY ALLEN COFFIELD, OF MARFA, TEXAS

VALVE DEVICE

Application filed February 2, 1931. Serial No. 513,003.

My invention relates to improvements in pressure seated valves which are adapted to be actuated by a float, or the like.

In accordance with my invention, I provide a valve of the above-mentioned character, embodying valve elements of different areas, which are acted upon by pressure exerted thereon in opposite directions, so that the resultant force is suitably reduced and the valve elements automatically seat. The valve casing is so constructed that an extremely simple connection is afforded between the actuating float and the valve elements.

In the accompanying drawings, forming a part of this specification, and in which like numerals designate corresponding parts throughout the same, Figure 1 is a side elevation of a valve device embodying my invention, Figure 2 is a plan view of the same, the float rod being broken away, Figure 3 is a central vertical longitudinal section through the valve casing and associated elements, Figure 4 is a front end elevation of the same, Figure 5 is a transverse section taken on line 5—5 of Figure 1.

In the drawings, wherein for the purpose of illustration is shown a preferred embodiment of my invention, the numeral 5 designates the body portion or rear chamber of the valve casing, which may be horizontally arranged, and is provided with an internally screw-threaded neck 6, adapted to be mounted upon a horizontal pipe 7, passing through the wall 8, of a tank, trough, or the like.

Formed integral with the upper portion of the body portion or chamber 5, is a tubular arm 9, in communication with the hollow chamber 5, at its rear end, and leading at its forward end into a forward chamber 10. The chamber 10 is connected with a, preferably, solid arm 11, integral therewith, and integral with the hollow body portion 5, as shown. The arms 9 and 11, preferably, converge forwardly. Arranged between the rear chamber 5, and the forward chamber 10, is a relatively large discharge passage or space 12, completely open at the opposite sides of the arms 9 and 11, as shown.

Arranged at the inner side of the chamber 10 is a valve seat 13 to be engaged by a forwardly seating valve element 14, preferably rigidly attached to a tubular stem 15, having its opposite end rigidly attached to a valve element 16, arranged to engage a valve seat 17, formed at the forward end of chamber 5. The valve element 16 also seats forwardly and has a substantially larger area than the valve element 14. Pressure is exerted upon the outer faces of the valve elements 14 and 16, in opposite directions, by the water but, due to the larger area of the valve element 16, the opposing forces are unbalanced, with the result that pressure will automatically seat the valve elements 14 and 16. The tubular valve stem 15 is slidably mounted upon a guide rod 18, having a screw-threaded portion 19, engaging within a screw-threaded boss 20, formed upon the forward end wall of the chamber 10, as shown.

Preferably formed integral with the upper tubular arm 9, and projecting above the same, is a lug 21, having a horizontal pin or pivot 22, secured thereto by any suitable means and projecting laterally beyond the same. This pin or pivot pivotally supports a vertically swinging lever or arm 23, having a horizontal sleeve 24, preferably formed integral with its upper end. The lever 23 extends downwardly upon one side of the tubular arm 9, and projects below the same, and is provided at its lower end with an elongated slot 25, receiving an extension or pin 26, preferably formed integral with the tubular valve stem 15.

The numeral 27 designates a rod, which is longitudinally adjustably mounted within the sleeve 24, and is clamped therein at the selected adjusted position by means of a bolt 28, or the like. A float 29 is suitably connected with the forward end of the rod.

As clearly shown in Figure 1, the valve and associated elements are generally horizontally arranged within a tank, trough, or the like, and the float engages with the water, and is elevated thereby. When the level of the water within the tank is lowered, the combined weight of the float 29 and the rod 27 is sufficient to overcome the resultant pressure upon the two valve elements, and the rod 27 swings downwardly, turning lever 23 upon its pivot, thereby unseating the two valve elements. When the water level again rises, the float is raised, and the valve elements are seated. Should the float 29 become disconnected from the rod 27, or should the rod carrying the float become disconnected from the sleeve 24, the valve elements will still automatically seat, due to the unbalanced pressure upon the same.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having thus described my invention, what I claim is:

1. A valve device comprising a valve casing including spaced rear and forward chambers having valve seats, an upper tubular arm connecting the chambers, a lower arm connecting the chambers, the space between the chambers being open at the sides of said arms, a valve element to engage the valve seat of the rear chamber, a valve element to engage the valve seat of the forward chamber, said valve elements being of different areas, means connecting the valve elements and to guide the same in their movement, a lever pivotally mounted upon the upper tubular arm and connected with the valve elements, and a float operated rod connected with the lever.

2. A valve device comprising a valve casing embodying longitudinally spaced rear and forward chambers having valve seats, a tubular arm connecting the chambers, valve elements to engage the valve seats and being of different areas, the space between the chambers being open, a sleeve connecting the valve elements, a guide rod connected with the forward chamber and slidably receiving the sleeve thereon, a pivoted lever arranged upon the side of the tubular arm and connected with the sleeve, and a float operated rod connected with the lever.

3. A valve device of the character described, comprising a valve casing embodying longitudinally spaced rear and forward chambers having valve seats and an open passage between them, a pair of arms connecting the chambers with one arm being tubular, valve elements to engage the valve seats and having different areas, a tubular element connecting the valve elements, a stationary guide rod slidably receiving the tubular element thereon, a lever pivoted to one arm and connected with the tubular element and provided with a sleeve, and a float operated rod longitudinally adjustably mounted within the sleeve.

In testimony whereof I affix my signature.

HENRY A. COFFIELD.